United States Patent [19]

Chen

[11] Patent Number: 4,850,662
[45] Date of Patent: Jul. 25, 1989

[54] HOE AND INDIRECT METHOD OF CONSTRUCTING SAME

[75] Inventor: Hsuan S. Chen, Midland, Mich.

[73] Assignee: Saginaw Valley State University, University Center, Mich.

[21] Appl. No.: 155,227

[22] Filed: Feb. 12, 1988

[51] Int. Cl.$^4$ ............................ G02B 5/32; G03H 1/04
[52] U.S. Cl. ..................................... 350/3.72; 350/3.83
[58] Field of Search ..................... 350/3.7, 3.72, 3.83

[56] References Cited

U.S. PATENT DOCUMENTS

| 4,447,111 | 5/1984 | Leib | 350/320 X |
| 4,735,486 | 4/1988 | Leib | 350/3.7 X |

FOREIGN PATENT DOCUMENTS 0123048 10/1984 European Pat. Off. ............. 350/3.7

OTHER PUBLICATIONS

Computer-Based Analysis of Hologram Imagery and Aberrations, I. Hologram Types and Their Nonchromatic Aberrations, *Applied Optics*, vol. 10, No. 3, p. 599, Mar. 1971, Latta, J. N.
Computer-Based Analysis of Hologram Imagery and Aberrations, II. Aberrations Induced by a Wavelength Shift, *Applied Optics*, vol. 10, No. 3, p. 609, Mar. 1971, Latta, J. N.
Computer-Originated Aspheric Holographic Optical Elements, Optical Engineering, vol. 21, No. 1, p. 133, Jan./Feb. 1982, Fairchild, R. C., Fienup, J. R.
Optimum Holographic Elements Recorded with Non-spherical Wave Fronts, *Journal of the Optical Society of America*, vol. 73, No. 2, p. 208, Feb. 1983, Winick, K. A., Fienup, J. R.
Magnification and Third-Order Aberrations in Holography, *Journal of the Optical Society of America*, vol. 55, No. 8, p. 987, Aug. 1965, Meier, Reinhard W.
Correction of Lens Aberrations by Means of Holograms, *Applied Optics*, vol. 5, No. 4, p. 589, Apr. 1966, Upatnieks, J., Vander Lugt, A., Leith, E.
Nonparaxial Imaging, Magnification, and Aberration Properties in Holography, Journal of the Optical Society of America, vol. 57, No. 1, p. 51, Jan. 1967, Champagne, Edwin B.

*Primary Examiner*—Bruce Y. Arnold
*Assistant Examiner*—David J. Edmondson
*Attorney, Agent, or Firm*—Brooks & Kushman

[57] ABSTRACT

A HOE for use in a wavelength $\lambda_3$ is made by recording a holographic corrector plate at a wavelength of $\lambda_1$. The HOE is then recorded at a wavelength $\lambda_2$. Aberration caused by differences between the wavelength of recording and the wavelength of HOE usage is compensated for by inserting the holographic corrector plate in one of the beams in used in recording the HOE.

32 Claims, 7 Drawing Sheets $\lambda_1 = 4880 Å$
$\lambda_2 = 6328 Å$
$\lambda_3 = 8300 Å$ $\lambda_1 = 5145 Å$
$\lambda_2 = 6328 Å$
$\lambda_3 = 8300 Å$

HOE AND INDIRECT METHOD OF CONSTRUCTING SAME

FIELD OF THE INVENTION

This invention relates to a method for recording a holographic optic element (HOE) and the HOE produced thereby, and more particularly to a double wavelength shift recording method.

BACKGROUND

Holographic optic elements, commonly referred to as HOEs, can be used as a substitute for, or a supplement to, convention refractive optical elements. One of the common problems associated with the use of HOEs is aberration, particularly when the HOE is provided with a low f/#. To resolve the aberration problem, a number of researchers have developed computer generated holograms having a simulated interference pattern recorded thereon which was generated using a computer model which sought to minimize aberration. Examples of computer generated holograms are discussed in Latta, J. N., "Computer-Based Analysis of Hologram Imagery and Aberration, I. Hologram Types and Their Non-chromatic Aberrations", *Applied Optics*, Vol. 10, No. 3, Page 599, March 1971; Latta, J. N., "Computer-Based Analysis of Hologram Imagery and Aberrations, II. Aberrations Induced by a Wavelength Shift", *Applied Optics*, Vol. 10, No. 3, Page 609, March 1971; Fairchild, R. C.,; Fienup, J. R., "Computer-Originated Aspheric Holographic Optical Elements", *Optical Engineering*, Vol. 21, No. 1, Page 133, January/February 1982; and Winick, K. A.; Fienup, J. R., "Optimum Holographic Elements Recorded With Nonspherical Wave Fronts", *Journal of the Optical Society of America*, Vol. 73, No. 2, Page 208, February 1983, which are incorporated by reference herein.

Since HOEs are recorded using photographic film, the wavelength of recording is limited by the range of wavelengths in which the film can be used and still have reasonable resolution. Available photographic film has such poor resolution in the infrared (IR) and near infrared (near IR) range that HOEs to be used in these ranges are preferably fabricated in the visible range where photographic film resolution is superior. There are severe aberration problems caused by recording a HOE at one wavelength and using it in another. By appropriately selecting a recording geometry, one or more of the various aberrations may be reduced or eliminated typically, however, not without a tradeoff in the terms of some other form of aberration. The effects recording geometry and wavelengths on the various types of aberration, i.e., spherical aberration, coma, astigmatism, curvature of field and distortion, have been documented in the literature as best shown in Meier, Reinhard W., "Magnification and Third-Order Aberrations in Holography", *Journal of the Optical Society of America*, Vol. 55, No. 8, Page 987, August 1965; Upatnieks, J.; Vander Lugt, A.; Leith, E., "Correction of Lens Aberrations by Means of Holograms", *Applied Optics*, Vol. 5, No. 4, Page 589, April 1966; and Champagne, Edwin B., "Nonparaxial Imaging, Magnification, and Aberration Properties in Holography", *Journal of the Optical Society of America*, Vol. 57, No. 1, Page 51, January 1967, which are incorporated by reference herein. Once one understands the causes of aberration using modern computer modeling techniques, a hologram recording geometry may be selected in which a HOE can be recorded in visible light and used in the IR or near IR range. The resulting HOEs made using normal construction techniques, however, are not diffraction limited at low f#s due to the influence of higher order phase error. In order to fabricate diffraction limited low f/# proposed to be used in the IR range, it was previously believed that computer generated hologram methods were necessary.

OBJECTS AND FEATURES OF INVENTION

An object of the present invention is to provide a method for simply recording diffraction limited low f/# HOE objective and collimating lens in visible light for use in the IR or near IR wavelength range.

Another object of the present invention is to utilize conventional object and reference point sources in standard holographic and photographic equipment to construct a HOE to be used in the IR or near IR range.

A specific object of the present invention is to frabricate a diffraction limited HOE having a f/# of 1.4 or less for use with a 830 nm diode laser.

An advantage of HOEs of the present invention is that very light weight HOEs can be used as substitutes for conventional refractive optics in IR applications where a low f/# is required.

Another advantage of the present invention is that low f/# IR HOEs may be fabricated without requiring the use of computer generated holographic techniques.

SUMMARY OF INVENTION

The present invention is directed to a method of recording a HOE objective or collimating lens and the HOE resulting therefrom. The HOE which is intended to be ultimately used at a third wavelength $\lambda_3$ is made by first recording a holographic corrector plate at a wavelength $\lambda_1$. The HOE is then recorded at a wavelength $\lambda_2$. Aberration caused by the difference between the wavelength of recording and the wavelength of HOE usage is compensated for by inserting the holographic corrector plate in one of the beams used in the recording of the HOE.

BRIEF DESCRIPTION OF PREFERRED EMBODIMENT

Figure 1:
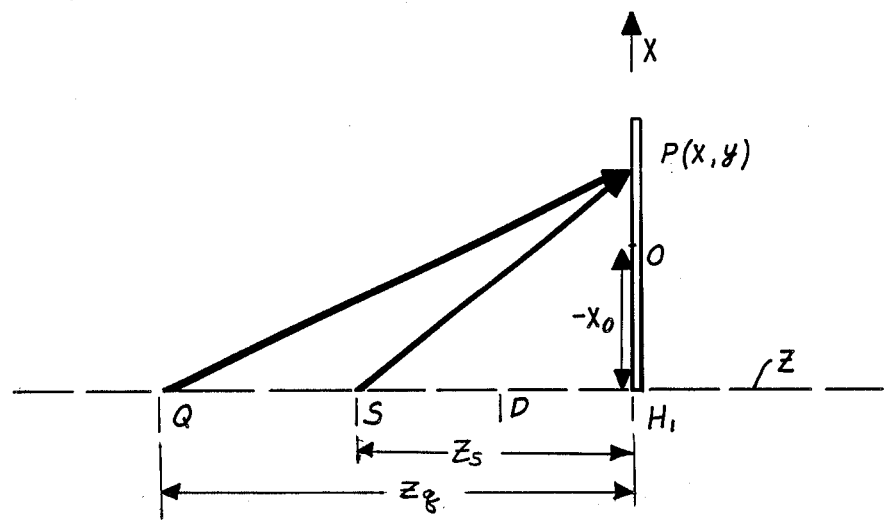
FIG. 1 is a diagram of the holographic corrector plate recording step.
Figure 2:
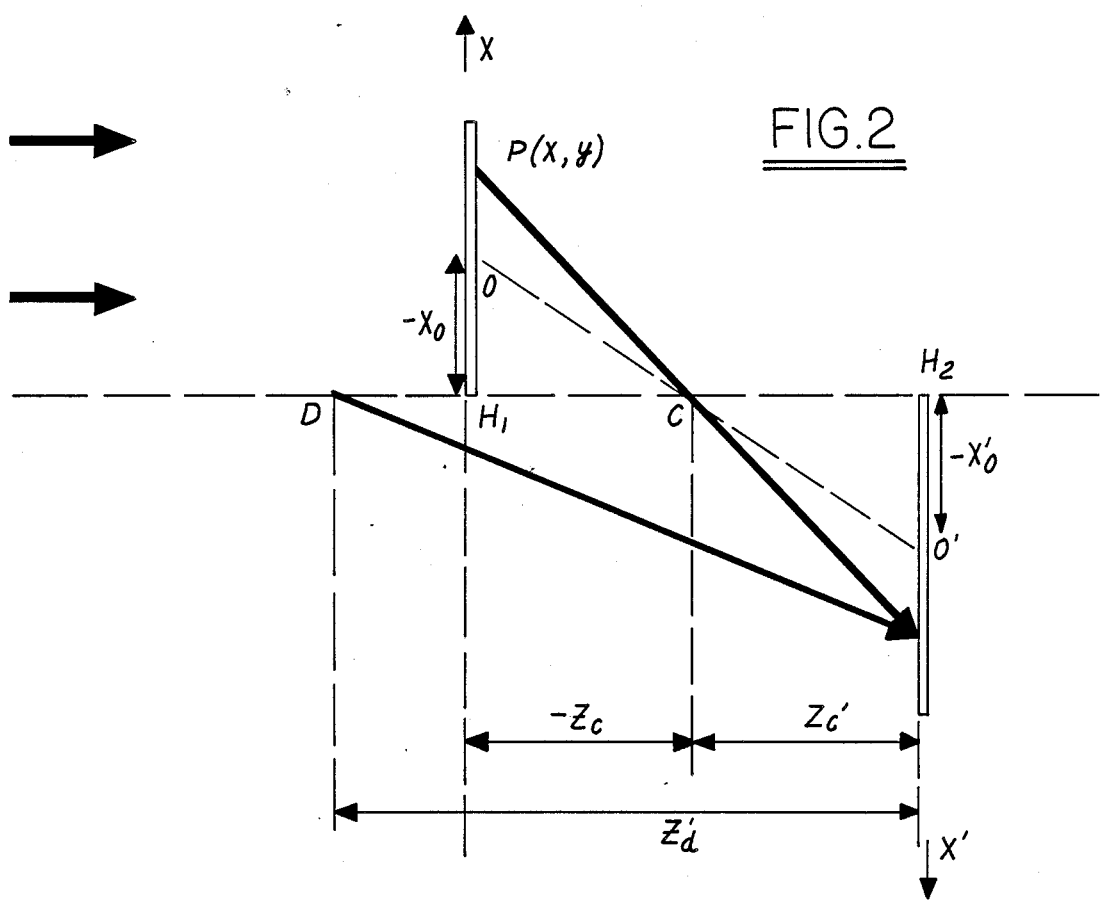
FIG. 2 is a diagram of the HOE recording step.
Figure 3:
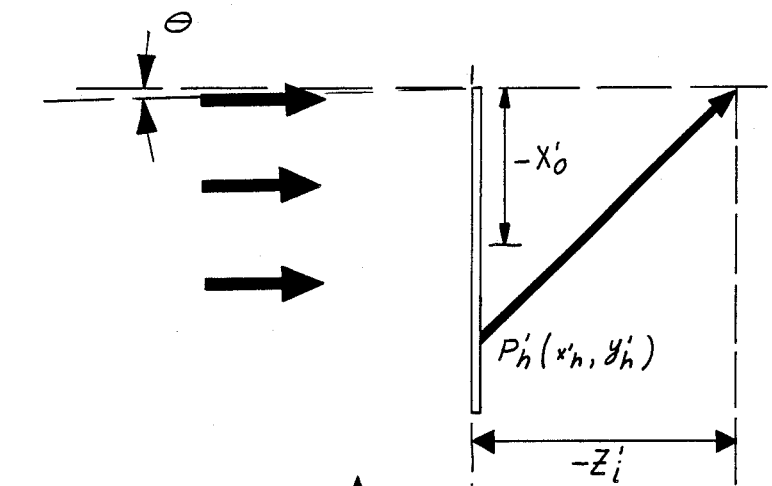
FIG. 3 is a diagram of the HOE in use.
Figure 4:
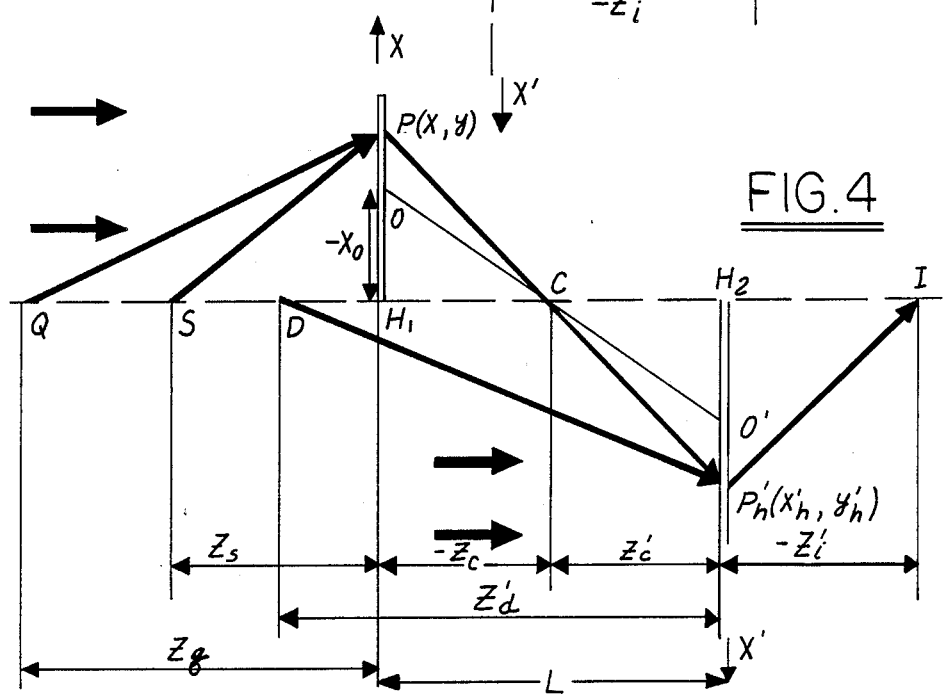
FIG. 4 is a composite diagram showing the interrelationship of FIGS. 1-3.

FIGS. 1-4 show schematic diagrams of the geometry utilized in the steps of HOE recording method and the optical geometry associated with HOE use. Utilizing the present method and the recording geometry of FIG. 2, a HOE is constructed at one wavelength $\lambda_2$ for use at a different wavelength $\lambda_3$ as shown in FIG. 3. In order to minimize aberration, which becomes a severe problem when f#s of the HOE is 1.5 or below, a holographic corrector plate H1 is installed in the light path of one of the beams and during HOE construction at wavelength $\lambda_2$. The holographic corrector plate H1 is recorded at a third wavelength $\lambda_1$ using the recording geometry shown in FIG. 1. The relationship between the corrector plate, the HOE recording geometry and the HOE reconstruction geometry is shown in FIG. 4, which is a composite of FIGS. 1-3. Wavelengths $\lambda_1$, $\lambda_2$ and $\lambda_3$ and the recording geometry are selected to minimize aberration resulting from the phase shift between HOE recording and HOE use.

FIG. 1 shows recording geometry used to generate the holographic corrector plate H1, using point sources Q and S oriented along the recording axis z. FIG. 2 is a diagram of the HOE recording step where HOE H2 is recorded using a point source D and reconstructed point source C. Point C is reconstructed by passing a collimated beam at $\lambda_2$ through corrector plate H1. The hologram recording in this two step process is shown in use in FIG. 3 where collimated light source is imaged to a point I. FIG. 4 is a composite drawing showing a corrector plate of HOE recording, HOE reconstruction, and the interrelationship therebetween.

The present method is particularly useful in recording HOE objective lens to be used in the IR or near IR wavelength. Ideally, you will record a HOE in the wavelength that it is to ultimately be used. In dealing in the near IR or IR range, however, the one wavelength technique poses two disadvantages, namely, the conventional holographic film sensitivity is extremely low or nil, and setting up the recording apparatus using a nonvisible light can be very difficult. The present method avoids these disadvantages by recording the HOE in a wavelength different that that in which it is ultimately to be used. An IR HOE can, therefore, be constructed in the visible range where sensitive film is high. This technique, however, results in aberration problems, particularly when f#s are low.

The present method minimizes aberration using a double wavelength shift technique to enable low f/# IR HOEs to be recorded in visible light. It should be noted that although the preferred method and HOE embodiments described are to be used in the near IR range, one should note that the invention is not limited to HOEs to be used solely in the nonvisible range, rather, the invention should be more broadly construed as a double wavelength shifting method.

In order to record a diffraction limited HOE having a low f/#, it is quite important to minimize the third order aberrations. The third order aberrations of concern are astigmatism, coma and spherical aberration. With a refractive lens, coma and astigmatism are zero for an object point on axis. There is a holographic analogy: if the object and reference beams fall on a line normal to the recording plate, these aberrations will be absent when the readout beam inpinges at normal incidence. This leaves only spherical aberration. The expression for third order spherical aberration indicates that it can be eliminated by properly choosing the radius of curvature of the object, reference and readout beams. For the required application, the readout beam is planar. Theory shows that making the reference beam slightly diverging instead of planar (as would be required for the perfect reconstruction case, with the making and reconstruction wavelength equal) the spherical aberration can be eliminated.

THE INDIRECT CONSTRUCTION METHOD: SINGLE WAVELENGTH SHIFT ZTOA

Figure 5:
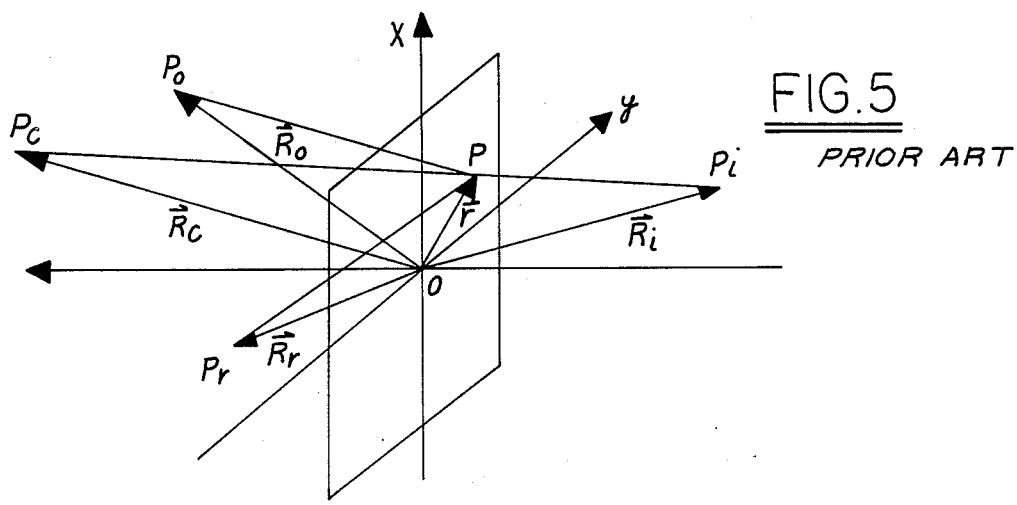
FIG. 5 is a diagram showing a conventional HOE recording system.

As previously described, recording of a HOE in the visible light wavelength region has a number of advantages over that of IR recording, however, one must overcome the serious aberration problems arising from wavelength shift between recording and readout. This problem has to be treated with great care, preferably by prearranging the recording geometry in accordance with aberration free configurations as suggested by various theories. For instance, the third order Seidel aberrations for holograms are well known and are available in closed form. In general, all Seidel aberrations cannot be made zero simultaneously. However, for the special case of concern here where only a single point is imaged, all aberrations can be made zero at once by the suitable choice of recording geometry (ZTOA configuration). A conventional recording geometry is illustrated in FIG. 5. The hologram recording plane is designated as the x-y plane; $P_o$, $P_r$, $P_c$, $P_i$ are the positions of the object point source, the reference point source, the readout point source, and the image point, respectively. All sources are on the x-z plane and the recording and readout wavelengths are $\lambda_o$ and $\lambda_c$ respectively. The third order Seidel aberration is, $$I_s = k_c[-\tfrac{1}{8}(x^2+y^2)^2 S + \tfrac{1}{2}(x^2+y^2)xC_x - \tfrac{1}{2}x^2 A_x], \tag{1}$$

where $k_c = 2\pi/\lambda_c$, and $$S = 1/R_c^3 \pm \lambda_c/\lambda_o(1/R_o^3 - 1/R_r^3) - 1/R_i^3, \tag{2}$$

$$C_x = x_c/R_c^3 \pm \lambda_c/\lambda_o(x_o/R_o^3 - x_r/R_r^3) - x_r/R_i^3, \tag{3}$$

$$A_x = x_c^2/R_c^3 \pm \lambda_c/\lambda_o(x_o^2/R_o^3 - x_r^2/R_r^3) - x_i^2/R_i^3, \tag{4}$$

with the positive sign of ($\pm$) standing for the primary image readout and the negative sign standing for conjugate image readout. S, $C_x$ and $A_x$ denote spherical aberration, coma and astigmatism, respectively. $R_o$, $R_r$, $R_c$ and $R_i$ are the linear distances from the object, reference, readout and reconstructed source and image points to the origin of the coordinate system, respectively. Also, the image-object distance relationship is approximated by matching of the first order phase term. In the form given by Champagne, we have:

$$1/R_i = 1/R_c \pm \lambda_c/\lambda_o(1/R_o - 1/R_r). \tag{5}$$

Also, as given by Champagne, $$x_i/R_i = x_c/R_c \pm \lambda_c/\lambda_o(x_o/R_o - x_r/R_r) \tag{6}$$

It is interesting to note that when $x_o = x_c = x_r$, Eq. (6) reduces to $$x_i = R_i[x_c/R_c \pm \lambda_c/\lambda_o(x_o/R_o - x_r/R_r)] = R_i x_o/R_i = x_o. \tag{7}$$

Also, Eqs. (3) and (4) reduce to $$C_x = x_0 S, \quad (8)$$

$$A_x = x_0^2 S. \quad (9)$$

The recording configuration specified by Eq. (7) is that of in-line holography. We note that the third order aberration can be totally eliminated under this recording geometry provided the spherical aberration is made zero, yielding the condition:

$$1/R_c^3 \pm \lambda_c/\lambda_0(1/R_o^3 - 1/R_r^3) - 1/R_i^3 = 0 \quad (10)$$

In the present case, one is interested in readout with parallel light only, i.e., $R_c \to \infty$. With this additional condition, Eqs. (5) and (10) can yield the recording geometry of the HOE objective designed to be read out with colimated IR beam:

$$\frac{R_r}{R_o} = \frac{1 + 2\lambda_c^2/\lambda_o^2 \pm \sqrt{12\lambda_c^2/\lambda_o^2 - 3}}{2(\lambda_c^2/\lambda_o^2 - 1)} \quad (11)$$

$$\frac{R_i}{R_r} = \frac{-3 \pm \sqrt{12\lambda_c^2/\lambda_o^2 - 3}}{2(\lambda_c^2/\lambda_o^2 - 1)} \quad (12)$$

Note that when the recording wavelength $\lambda_o$, the readout wavelength $\lambda_c$ and the focal length of the HOE objective are specified, the location of the object beam and reference beam point source can be determined by Eqs. (11) and (12).

Figure 6:
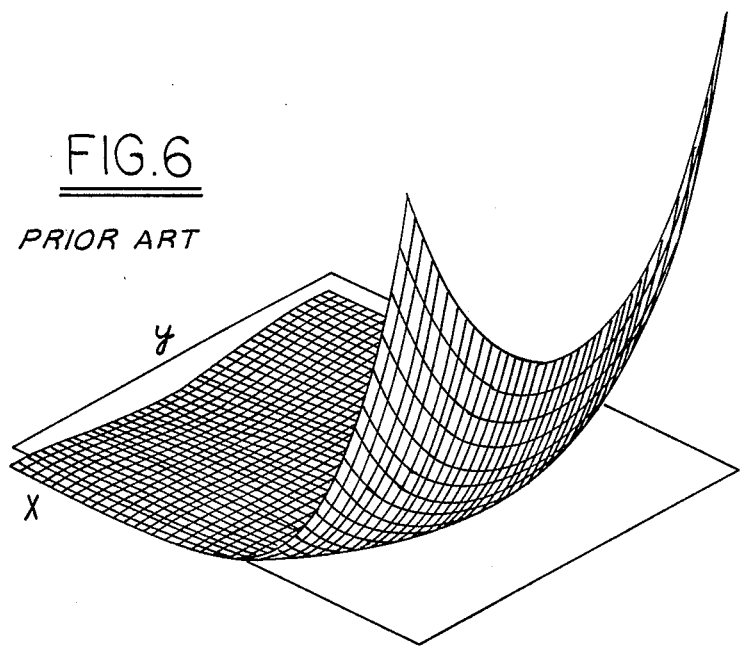
FIGS. 6-8 are prospective views of a three dimensional phase error plot for HOEs constructed using different methods.
Figure 9:
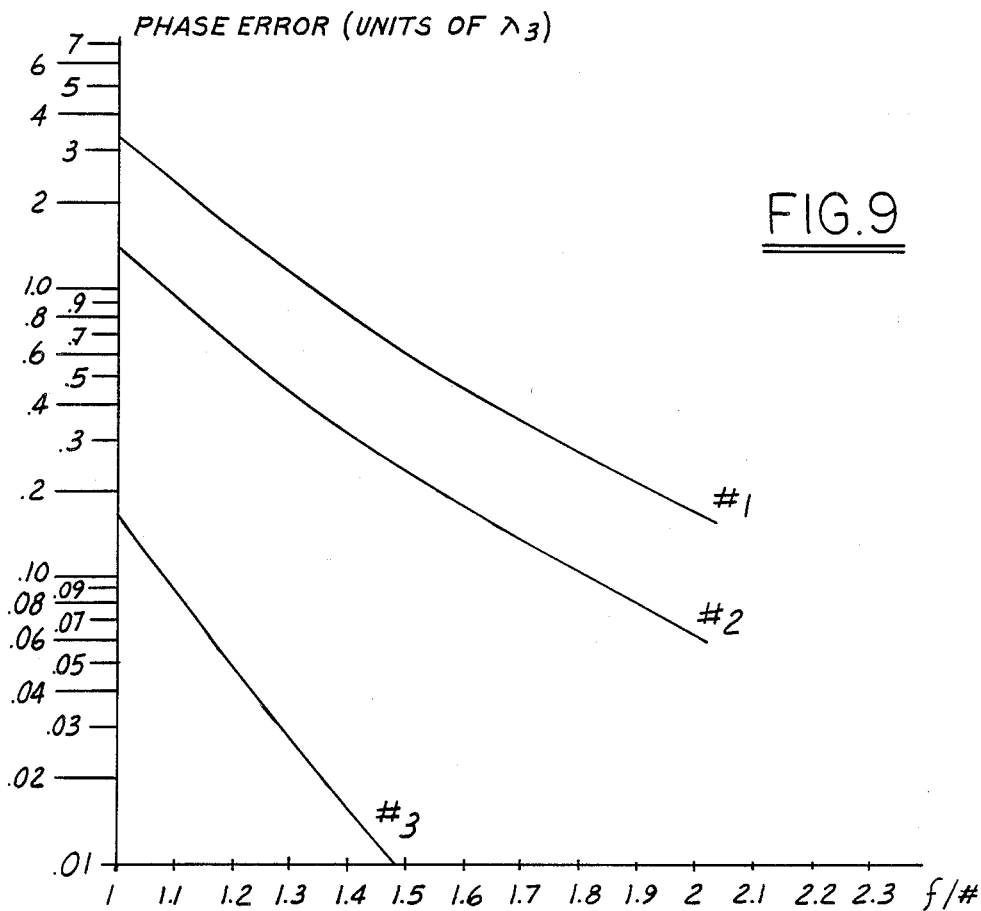
FIG. 9 is a logarithmic plot of f/# versus root means square phase error.

FIG. 6 shows a three dimensional phase error plot of a HOE fabricated in accordance with the configuration of zero third order aberration (ZTOA). In FIG. 9 curve 1 shows a plot of the log of rms phase error in terms of wavelengths versus the f/# of the HOE. Note that when the f/# is less than f/2.0, the phase error of the HOE exceeds a quarter of wavelength. This phase error results from the higher order aberrations, which become significant when the focal length of the HOE is small.

WAVEFRONT MATCHING ALGORITHM: MINIMUM RMS PHASE ERROR

Total phase error can be further reduced using an exact analysis modeling technique, which unlike for the refractive lens, is not particularly difficult. The exact phase error expression is readily available in closed form and is easily handled by a small computer. The case of zero third order aberration as the starting point, a computer search is then conducted for a configuration with the least total aberration, where the variable parameters include the radii of curvature of the various beams, as well as the lateral position of their centers of curvature. The aberration function is similar to surface terrain in an N-dimensional space, an analogy used by lens designers. The point that represents zero of the third order aberrations is not a minimum, (the bottom of a valley) but is relatively close to a minimum, hence is a good starting point. Then by an iteration process a minimum is determined. In aberration terms, third order aberration has been deliberately introduced and used to balance out higher order aberrations.

Figure 7:
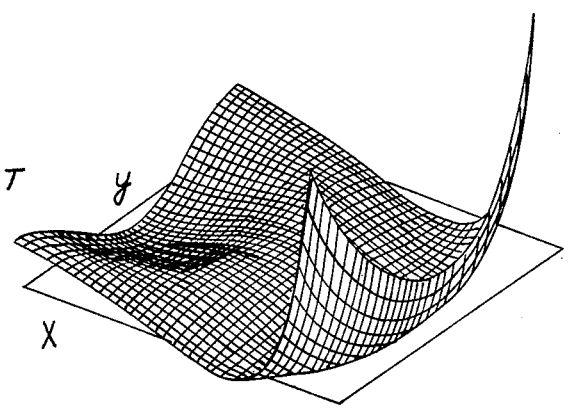

FIG. 7 is a three dimensional phase error plot of a HOE fabricated in accordance with the minimum total phase error technique. In FIG. 9, curve B shows a plot of the log of rms phase error versus f/# or similar minimum phase error HOEs. While there is a significant improvement between the ZTOA curve, phase error still exceeds $\lambda/4$ when f/# is below 1.5. In some practical cases where a low f/# is not necessary, the residual aberration with only a single wavelength shift can be less than $\lambda/4$, in which case the design problem is solved.

Referring to FIG. 5, the optical fields of the point object source and the point reference source impinging hereon can be represented as $u_o = \exp ik_0|R_o - r|$ and $u_r = \exp ik_0|R_r - r|$, the irradiance at the HOE recording plane is:

$$I = u_o u_r^* = \exp ik_0[|R_o - r| - |R_r - r|] \quad (13)$$

When the resulting HOE is illuminated by a plane wave $u_c = \exp ik_c \sin\theta_x x$, ($\theta_x$ the angle the wavefront propagation direction makes with the z axis), the wave emerging from the HOE will be $$u_i = u_o u_r^* u_c = \exp i\{k_0[|R_o - r| - |R_o - r|] + K_c \sin\theta_x x\} \quad (14)$$

In our case, we require $u_i$ to represent a convergent spherical wave that forms a real point image at $R_i$:

$$u = \exp{-i(k_c|R_i - r|)} \quad (15)$$

Any deviation of the phase in the expression (14) from that of (15) represents aberration. The phase error from the recording geometry is defined as:

$$\Delta\Phi = k_0[|R_o - r| - |R_r - r|] + k_c \sin\theta_x x + k_c |R_i - r| \quad (16)$$

The quantitative measure of the aberration we take as the root mean square value of the phase error over the entire surface of the HOE, i.e., $$A = [(\int dxdy \, |\Delta\Phi|^2)/(\int dxdy)]^{\frac{1}{2}} \quad (17)$$

$$= \left[\sum_{i=1}^{N}\sum_{j=1}^{N}(\Delta\Phi_{ij})^2/N^2\right]^{\frac{1}{2}}$$

where $\Delta\Phi_{ij}$ denotes the phase error in the ij-th cell at location $(x_i, y_j)$ on HOE, where $$x_i = (-N/2 + i)\Delta x; \quad y_j = (-N/2 + j)\Delta y. \quad (18)$$

$\Delta x \Delta y$ is the area of a sampling cell. Using a computer iterative algorithm, starting with the configuration of zero third order aberration, the computer program searches for the set of recording parameters that minimizes Eq. (17). For example, the best geometry for a HOE of f−1.3 and F=7.5 mm yields a root mean square phase error of 3.71 radians, i.e., somewhat over one half wavelength. A computer plot of phase error as a function of (x, y) on HOE surface is shown in FIG. 7. Here the size of the grid is 0.2 mm by 0.2 mm, the maximum phase error on the plot is located at x=3 mm, y=0, which deviates from the mean phase plane by one readout wavelength.

DOUBLE WAVELENGTH SHAFT METHOD: A HEURISTIC MODEL

In the present method, the phase corrector plate H1 is used only to introduce the compensating phase error to one of the two spherical wavefronts during the final recording of the HOE, H2. Only H2 alone will be used as the objective in the designated application.

In FIG. 4 a composite diagram of the geometry of the making of HOE is shown. The phase corrector plate H1 is fabricated by recording the interference fringes of two point coherent light source of the shortest wavelength $\lambda_1$ located at Q $(x_o, O, z_q)$ and S $(x_o, O, z_s)$ respectively. H1 is made with in-line configuration, designed to be readout with the plane wave (indicated by horizontal arrows at upper left) of the intermediate wavelength $\lambda_2$ to form a point image C $(x_o, O, z_c)$ that is free from the third order aberrations (ZTOA). With this reconstructed wavefront which emulates a slightly aberrated spherical wave interfering with another spherical wavefront of $\lambda_2$, with a lesser curvature, centered at D $(x'_o, O, z'_d)$ forms the fringes of the final HOE H2. Again we choose the geometry of ZTOA for plane wave (indicated by the horizontal arrows at lower center) of the long wavelength $\lambda_3$ to readout forming a point image I $(x'_o, O, z'_i)$ at the designated focal point of the HOE. The origins O of the coordinates in the recording of H1 is located at the center of H1, whereas the origin O' of the coordinates for the recording geometry of H2 is located at the center of H2. Note that H1 and H2 are aligned in perfect parallel yet completely offset in x-dimension with respect to z-axis during the final fabrication of HOE as shown in FIG. 2. With this arrangement, the phase error at I under the ZTOA configuration can be compensated by that of the corrector plate.

A heuristic explanation to the phase compensation of the present recording scheme is based upon simple geometrical optics. It is reasonable to assume that the diffracted light emerging from any point P (x, y, 0) on H1 when it is readout by the parallel light of the wavelength $\lambda_2$ will pass through the point C arriving at $P'_h(x'_h, y'_h, 0)$ on H2, the HOE as shown in FIG. 1. The primed quantities refer to the distances or positions in the recording configuration of H2, thus are specified by the coordinate system centered on H2. C, in this case could be considered as bottleneck of all rays propagating from H1 to H2. Observe that there exists an geometrical relationsip between P and P':

$$x' = |\overrightarrow{CP_h'}|/|\overrightarrow{PC}| \cdot x = \nu x \quad (19)$$

$$y' = \nu y \quad (20)$$

Here $\nu = |\overrightarrow{CP_h'}|/|\overrightarrow{PC}|$ is the scale ratio between the two coordinates, an important parameter to adjust for optimum recording. When H1 is illuminated with plane wave of the wavelength $\lambda_3$, the overall phase lag at I $(x'_o, 0, z'_i)$, the image point of the hologram from the first order theory $$\Phi = 2\pi/\lambda_1 [(|\overrightarrow{QP}| - |\overrightarrow{SP}|) + 2\pi/\lambda_2 \cdot \quad (21)$$

$$(|\overrightarrow{PC}| - |\overrightarrow{DP_h'}| + |\overrightarrow{CP_h'}|) - 2\pi/\lambda_3 |\overrightarrow{P_hI}|]$$

$$= 2\pi/\lambda_3 \{\lambda_3/\lambda_2 [\lambda_2/\lambda_1 (\sqrt{(x-x_o)^2 + y^2 + z_q^2}$$

$$-\sqrt{(x-x_o)^2 + y^2 + z_s^2}) + \sqrt{(x-x_o)^2 + y^2 + z_c^2}]$$

$$-\nu[\lambda_3/\lambda_2 \cdot \sqrt{(x-x_o)^2 + y^2 + (z'_d/\nu)^2}$$

-continued $$-\lambda_3/\lambda_2 \sqrt{(x-x_o)^2 + y^2 + z_c^2} + \sqrt{(x-x_o)^2 y^2 + (z'_i/\nu)^2} ]\}$$

Here we have made the substitutions: $x'_h = \nu x$, $y'_h = \nu y$, $x'_x = \nu y_o$, $z'_c = -\nu z_c$ respectively. In the expression (21), if we choose $\lambda_3/\lambda_2 = \lambda_2/\lambda_3 = \nu$, it is possible to cancel the phase errors completely by the proper choice of the recording geometry. For instance, the first and the fourth can be made to cancel completely if we choose $z_q = (z'_d/\nu)$, if we made $z_s = -z_c$, and $z_c = z'_c/\nu$ respectively. Notice that these additional relations will not contradict the prior assumptions for the recording scheme, only that $\lambda_2/\lambda_1$ must equal to $\sqrt{5}$ in order to maintain the ZTOA configuration.

This new recording scheme allows more adjustable parameters for the further reduction of phase errors of the reconstructed image point in H2, thus the performance of the final HOE objective can be vastly improved over the ZTOA HOE.

DOUBLE WAVELENGTH SHAFT METHOD: A RAY TRACING MODEL

Figure 11:
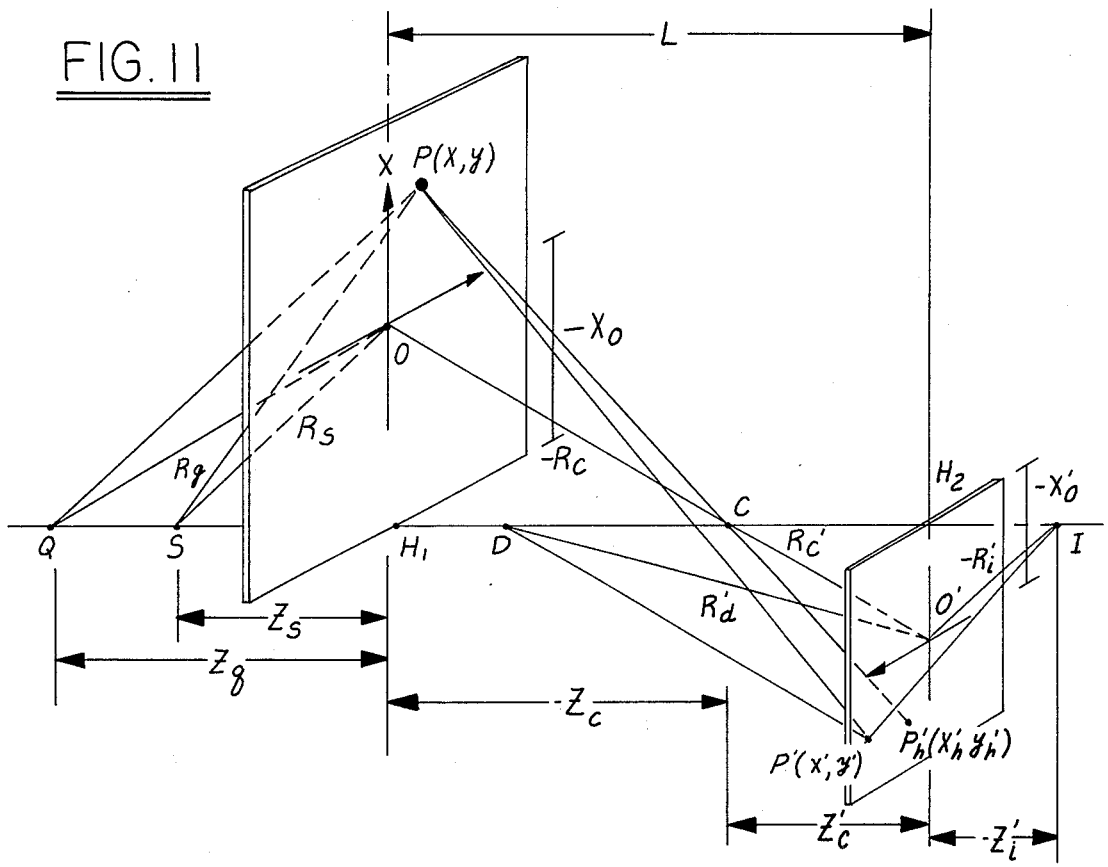
FIG. 11 is a composite diagram showing the actual method of hologram analysis.

When the corrector plate is readout by a plane wave of $\lambda_2$, propagating in the direction perpendicular to the H1, a ray of the reconstructed wavefront, emerges from P on H1 will arrive at P' as shown in FIG. 11. It is important to know tht P'(x',y',0) is not the same as $P'(x'_h, y'_h, 0)$ that was defined in the heuristic consideration previously, yet they are almost coincidental. Assuming that $(\alpha_q, \beta_q, \gamma_q)$, $(\alpha_s, \beta_s, \gamma_s)$, $(\alpha_c, \beta_c, \gamma_c)$ are the directional cosines of (QP), (SP), (P p') respectively, the grating equation of the hologram yields:

$$\alpha_c = \lambda_2/\lambda_1(\alpha_q - \alpha_s) \quad (22)$$

$$\beta_c = \lambda_2/\lambda_1(\beta_q - \beta_s) \quad (23)$$

With $$\alpha_s = \frac{x - x_0}{\sqrt{(x-x_o)^2 + y^2 + z_s^2}} \quad (24)$$

$$\beta_s = \frac{y}{\sqrt{(x-x_o)^2 + y^2 + z_s^2}} \quad (25)$$

$$\alpha_q = \frac{x - x_o}{\sqrt{(x-x_o)^2 + y^2 + z_q^2}} \quad (26)$$

$$\beta_q = \frac{y}{\sqrt{(x-x_o)^2 + y^2 + z_q^2}} \quad (27)$$

Observe that $\alpha_c$ and $\beta_c$ are completely determined when P is given. Furthermore, from the definition of the directional cosine, we have:

$$\gamma_c = -\sqrt{1 - \alpha_c^2 - \beta_c^2} \quad (28)$$

With (26), (27) and (28) one can easily obtain the coordinates x' and y' of the point P':

$$x' = L\alpha_c/\gamma_c - x + x_o + x_o' \quad (29)$$

$$y' = L\beta_c/\gamma_c - y \quad (30)$$

Here it is shown that for any give point P(x,y) on H1, one can find the corresponding point P'(x',y') by this generalized ray tracing technique as outlined above. When the finished H1 is readout by parallel light of wavelength $\lambda_2$, a convergent quasi-spherical wave will emerge from H1, arriving point $C(x_o, O, z_c)$. The cumulative phase at I for the ray initiated from $P'(x',y')$ can be written as:

$$\psi = 2\pi/\lambda_1 (|\overrightarrow{QP}| - |\overrightarrow{SP}|) + 2\pi/\lambda_2 (|\overrightarrow{PP}| - |\overrightarrow{DP}|) \quad (31)$$

$$-2\pi/\lambda_3 |\overrightarrow{PI}|$$

$$= 2\pi/\lambda_3 [\lambda_3/\lambda_1 (|\overrightarrow{QP}| - |\overrightarrow{SP}|) - \lambda_3/\lambda_2$$

$$(L/\gamma_c + |\overrightarrow{DP}|) - |\overrightarrow{PI}|]$$

with $$|\overrightarrow{QP}| = \sqrt{(x-x_o)^2 + y^2 + z_q^2} \quad (32)$$

$$|\overrightarrow{SP}| = \sqrt{(x-x_o)^2 + y^2 + z_s^2}$$

$$\gamma_c = \sqrt{1 - (\lambda_2/\lambda_1)^2 [(\alpha_s - \alpha_q)^2 + (\beta_s - \beta_q)^2]}$$

$$|\overrightarrow{DP}| = \sqrt{(x'-x_o')^2 + y'^2 + z_d'^2}$$

$$= \sqrt{(L\alpha_c/\gamma_c - x + x_o)^2 + (L\beta_c/\gamma_c - y)^2 + z_d'^2}$$

$$|\overrightarrow{PI}| = \sqrt{(L\alpha_c/\gamma_c - x + x_o)^2 + (L\beta_c/\gamma_c - y)^2 + z_i'^2}$$

The merit function is defined as the root mean square value of the phase error over the whole H1 plate:

$$(\Delta\psi)_{rms} = \frac{[\int [\psi(x,y) - \overline{\psi}]^2 dxdy]^{\frac{1}{2}}}{\int dxdy} \quad (33)$$

$$= \frac{\sqrt{\sum_{ij}^{N} [\psi(x_i, y_j) - 1/N^2 \sum_{ij}^{N} \psi(x_i', y_j')]^2}}{N^2}$$

For calculation purpose, one can approximate the integral over the HOE by the summation over the grid point defined by:

$$x_i = x_o - ix_o/N, \quad (34)$$

$$y_j = y_o - jx_o/N.$$

The strategy in optimizing the geometry is to find a parameter which minimizes the expressions (31) and (32).

Although the expressions (31) and (32) are quite similar in form to the expression (21), the x-dependence of it is quite different from that of (21). Here the result is derived from the generalized ray tracing following the basic grating equations, without assuming the existence of a bottleneck with C in the heuristic consideration, hence the result is almost exact.

RECORDING GEOMETRY PARAMETER SELECTION

As previously described, ZTOA recording configurations usually yield a good result for HOE with high f/#. However, as the f/# becomes low, for instance less than f/2, the rms phase error yields the progressively worse result as f/# dropping. Close study of the phase error terrain of rays tracing through $P(x,y,O)$ on the plane of HOE arriving at the image point, reveals a general trend of the phase distribution like the one shown in FIG. 6. Here, the terrain of the phase error near the axis of the in-line configuration (passing perpendicular to x-y plane at the center of far left edge) is relatively flat and this flatness stretched out about $\frac{2}{3}$ way out then rising rapidly in the region that is far from the axis. In our tandem recording scheme that utilizes a corrector plate, where their two phase terrains are made to subtract from each other thus reduces the overall phase error of H2 drastically. The degree of the error reduction is determined by the scale factor v between the recording configuration in the making of H1 and H2, as defined previously:

$$v = (\overrightarrow{OC})/(\overrightarrow{CO'}), \quad (35)$$

Where C is the image point formed by the corrector plate H1 when it is readout by the parallel plane wave of the wavelength $\lambda_2$. The condition for the optimized recording geometry is thus given by $$\partial(\Delta\psi)_{rms}/\partial v = 0 \quad (36)$$

Referring to FIG. 11, the radial distances are defined as:

$$R_s = |\overrightarrow{SO}|, R_q = |\overrightarrow{QO}|, R_c = -|\overrightarrow{OC}|, R_c' = |\overrightarrow{CO'}|,$$
$$R_d' = |\overrightarrow{DO'}|, R_i' = -|\overrightarrow{OI}|.$$

Here O and O' are origins of coordinate systems with respect to H1 and H2 respectively; C and I are image points in ZTOA configurations for the recording schemes of H1 and H2 respectively. As pointed out in the previous section, all radial quantities in ZTOA configuration satisfy:

$$1/R_c = \lambda_2/\lambda_1 (1/R_q - 1/R_s) \quad (37)$$

$$1/R_i' = \lambda_3/\lambda_2 (1/R_d' - 1/R_c') \quad (38)$$

$$\frac{R_s}{R_q} = \frac{1 + 2(\lambda_2/\lambda_1)^2 - \sqrt{12\lambda_2^2/\lambda_1^2 - 3}}{2(\lambda_2^2/\lambda_1^2 - 1)} = U \quad (39)$$

$$\frac{R_c'}{R_d'} = \frac{1 + 2(\lambda_3/\lambda_2)^2 - \sqrt{12\lambda_3^2/\lambda_2^2 - 3}}{2(\lambda_3^2/\lambda_2^2 - 1)} = U' \quad (40)$$

Here it is assumed that H1 and H2 are both readout with the parallel plane waves of the wavelength $\lambda_2$ and $\lambda_3$, respectively.
Furthermore, the scaling factor v satisfies:

$$R_c' = vR_c \quad (41)$$

Equations (37) to (41) enables all radial distances in the recording geometry to be expressed in terms of $R_c$, the radial distance from the reconstructed image to H1.

$$R_i' = vR_c/[\lambda_3/\lambda_2 (1 - U')] \quad (42)$$

$$R_s = \lambda_2/\lambda_1 (U - 1) R_c \quad (43)$$

$$R_q = (U - 1)/U \lambda_2/\lambda_1 R_c \quad (44)$$

$$R_d' = -v/U' R_c \quad (45)$$

$$L = \sqrt{R_c^2 - x_o^2} \cdot (1 + v) \quad (46)$$

Through equations (39), (43) and (44), we note that the recording geometry of H1 is uniquely determined by the wavelengths $\lambda_1$, $\lambda_2$, $\lambda_3$; and $R_c$. On the other hand, we observe through (40), (42), (45) and (46) that the recording geometry for the H2 depends also on an external parameter v, the scaling factor. This allows us to vary the parameter until the phase error:

$$\psi = 2\pi/\lambda_3 \, [\lambda_3/\lambda_1 \, (|\overrightarrow{QP}| - |\overrightarrow{SP}|) + \quad (47)$$
$$\lambda_3/\lambda_2 \, (-L/\gamma_c - |\overrightarrow{DP'}|) - |\overrightarrow{P'I}|]$$

is minimized. In this expression, distances $|\overrightarrow{QP}|$ and $|\overrightarrow{SP}|$ can be readily expressed in terms of the system parameters, $$|\overrightarrow{QP}| = \sqrt{(x - x_o)^2 + y^2 + z_q^2} \, , \text{ with } z_q = \sqrt{R_q^2 - x_o^2}; \quad (48)$$

and $$|\overrightarrow{SP}| = \sqrt{(x - x_o)^2 + y^2 + z_s^2} \, , \text{ with } z_s = \sqrt{R_s^2 - x_o^2}. \quad (49)$$

The distances $|DP'|$ and $|P'I|$ can also be expressed in terms of the system parameters and v:

$$|\overrightarrow{DP'}| = \sqrt{(x' - x_o')^2 + y'^2 + z_{d'}^2} \, , \text{ with } z_{d'} = \quad (50)$$
$$\sqrt{(R_d'^2 - x_o'^2;}$$

and $$|\overrightarrow{P'I}| = \sqrt{(x' - x_o')^2 + y'^2 + z_{i'}^2} \, , \text{ with } z_{i'} = \quad (51)$$
$$\sqrt{R_i'^2 - x_o'^2}.$$

In order to facilitate the realization of phase error minimization through equation (36), equation (47) will reduce to a form of polynomials in v. Refer to FIG. 11, where an auxiliary field point $P'_h$ on H2 is introduced, where $x'_h, y'_h$ obeys the geometric relationship $$x'_h = vx, \quad y'_h = vy. \quad (52)$$

Note that the ray $|\overrightarrow{PP'_h}|$ is "the ray" that is initiated from the field point P(x,y) on H1 as depicted in FIG. 4 in our heuristic overview of the technique. Be it may that the ray $\overrightarrow{PP'_h}$ does not satisfy the grating equations (22) and (23) exactly yet it must be very close to the actual ray $\overrightarrow{PP'}$. Therefore, a good approximation can be expected when we keep only the low order terms in the power series expansion of $|\overrightarrow{PP'}|$ with respect to $(x' - x'_h)/R_c$ and $(y' - y'_h)/R_c$ in Equation (50). After a lengthy derivation, one obtains:

$$|\overrightarrow{DP'}| = R_c \{ v K_1 + (1 + v)^2/(2 v K_1)(K_3^2 + K_4^2) + \quad (53)$$
$$(1 + v)/ K_1 \, [K_3 (x - x_0)/R_c + K_4 y/R_c] - (1 + v)^2/(2vK_1^3) \cdot$$
$$[K_3 (x - x_0)/ R_c + K_4 (y/ R_c)]^2 \}$$

Here, the coefficients $$K_1 = \sqrt{1/U^2 - (x_o/R_c)^2 + [(x - x_0)/R_c]^2 + (y/R_c)^2} \quad (54)$$

$$K_2 = 1/\gamma_c \sqrt{1 - (x_o/R_c)^2} \quad (55)$$

$$K_3 = K_2 \alpha_c + (x_o - x)/R_c \quad (56)$$

$$K_4 = K_2 \beta_c - y/R_c \quad (57)$$

Similarly, $$|\overrightarrow{P'I}| = R_c \{ v K_5 + (1 + v)^2/(2 \, v K_5)(K_3^2 + K_4^2) + \quad (58)$$
$$(1 + v)/(K_5 \, [K_3 \, (x - x_0)/R_c + K_4 y/R_c] -$$
$$(1 + v)^2/(2vK_5^3) \, [K_5 \, ((x - x_0)/R_c) + K_4 \, (y/R_c)]^2$$

with:

$$K_5 = \quad (59)$$
$$\sqrt{\lambda_2^2/[\lambda_3^2 (1 - U')^2] - (x_o/R_c)^2 + ((x - x_0)/R_c)^2 + (y/R_c)^2}$$

Furthermore, the third term in (47) can be written as:

$$L/\gamma_c = -R_c K_2 (1 + v) \quad (60)$$

Expressions (48), (49), (53), (58) and (60) are substituted back to (47). After a brief reduction, (47) yields:

$$\psi = -2/\pi\lambda_3 \, R_c \, (G_1/v + G_2 + G_3 v) \quad (61)$$

Here, $$G_1 (x,y) = \tfrac{1}{2}[K_3^2 + K_4^2][\lambda_3/\lambda_2 \, (1/K_1) + 1/K_5] - \quad (62)$$
$$\tfrac{1}{2} \, [K_3 \, (x - x_0)/R_c + K_4 y/ R_c]^2$$
$$[\lambda_3/\lambda_2 \, (1/K_1^3) + 1/K_5^3]$$

$$G_2 (x,y) = \lambda_3/ \lambda_1 \, (-|\overrightarrow{QP}| + |\overrightarrow{SP}|)/R_c + (\lambda_3/(\lambda_2 K_1) + \quad (63)$$
$$1/K_5)(K_3^2 + K_4^2 + K_3 \, (x - x_0)/R_c + K_4 y/ R_c) + (\lambda_3/\lambda_2) \, K_2 -$$
$$(\lambda_3/\lambda_2 K_1^3) + 1/K_5^3) \, (K_3 \, (x - x_0)/R_c + K_4 y/R_c)^2$$

$$G_3 (x,y) = (\lambda_3/ \lambda_2 \, (/K_1) - 1/K_5) \, [\tfrac{1}{2}(K_3^2 + k_4^2) + \quad (64)$$
$$K_3 \, (x - x_0)/R_c + K_4 y/R_c] + K_5 + (\lambda_3/\lambda_2)(K_1 + K_2) -$$
$$\tfrac{1}{2}[\lambda_3/(\lambda_2 K_1^3) + 1/k_3^3] \cdot [(K_3(x - x_0)/R_c) +$$
$$(K_4 y/R_c)]^2$$

The coefficients $G_1$, $G_2$, $G_3$ are independent of v.

Now the recording configuration is optimized by imposing the condition as stated in Equation (36), thus yields:

$$A_4 v^4 + A_3 v^3 + A_1 v + A_0 = 0 \quad (65)$$

The solution v of this 4th order polynomial is the scaling factor for the optimal recording configuration. The coefficients A's are defined as follows:

$$A_o = -\sum_{i,j}^{N} \left[ G_1 \, (x_i, y_j) - 1/N^2 \sum_{i',j'}^{N} G_1 \, (x_{i'}, y_{j'}) \right]^2 \quad (66)$$

$$A_1 = -\sum_{i,j}^{N} \left[ G_2 \, (x_i, y_j) - 1/N^2 \sum_{i',j'}^{N} G_2 \, (x_{i'}, y_{j'}) \right]. \quad (67)$$

-continued $$\left[ \sum_{i,j}^{N} G_1(x_i, y_j) - 1/N^2 \sum_{i',j'}^{N} G_1(x_{i'}, y_{j'}) \right]$$

$$A_3 = -\sum_{i,j}^{N} \left[ G_2(x_i, y_j) - 1/N^2 \sum_{i',j'}^{N} G_2(x_{i'}, y_{j'}) \right] \cdot \qquad (68)$$

$$\left[ G_3(x_i, y_j) - 1/N^2 \sum_{i',j'}^{N} G_2(x_{i'}, y_{j'}) \right]$$

$$A_4 = -\sum_{i,j}^{N} \left[ G_3(x_i, y_j) - 1/N^2 \sum_{i',j'}^{N} G_3(x_{i'}, y_{j'}) \right]^2 \qquad (69)$$

Figure 10:
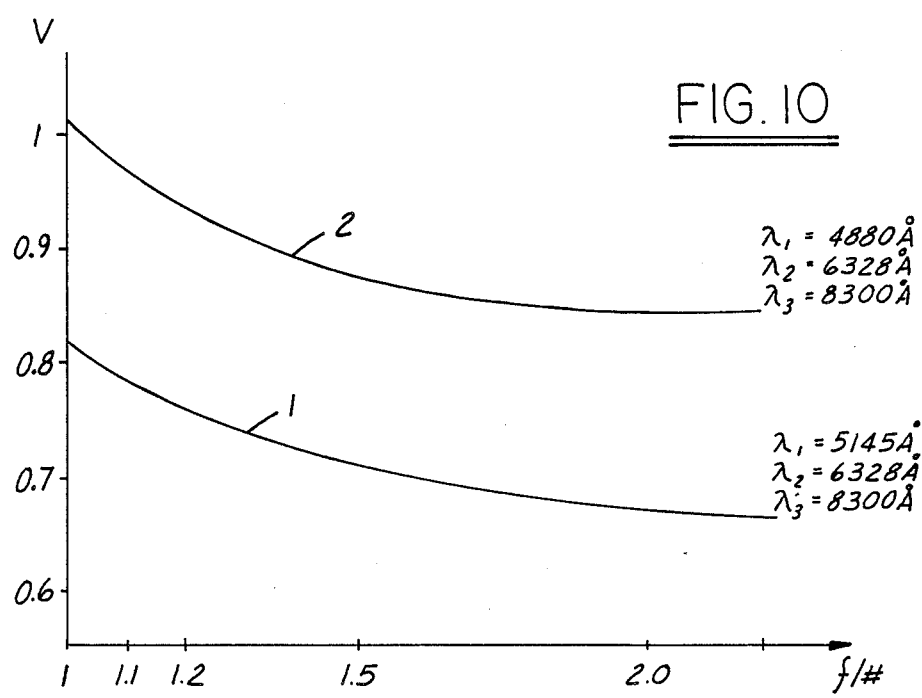
FIG. 10 is a plot of f/# versus scaling factor.

The optimal values of v is plotted against the f/# for a HOE objective designed to be used at 830 nm is shown in FIG. 10.

One should note that phase error is expressed as a function of the other pertinent parameters, such as $\lambda_1$, $\lambda_2$, $\lambda_3$, $x_o'$, $z_i'$. Notice that z' is the final focal length of the HOE and $z'_i/(2x'_o)$ is the f/# of the HOE. $\lambda_1, \lambda_2, \lambda_3$ are wavelengths available to the fabrication. All these should be considered as specifications or the system parameters, should be determined before the optimization of the configuration being considered.

COMPUTER MODEL

Figure 12:
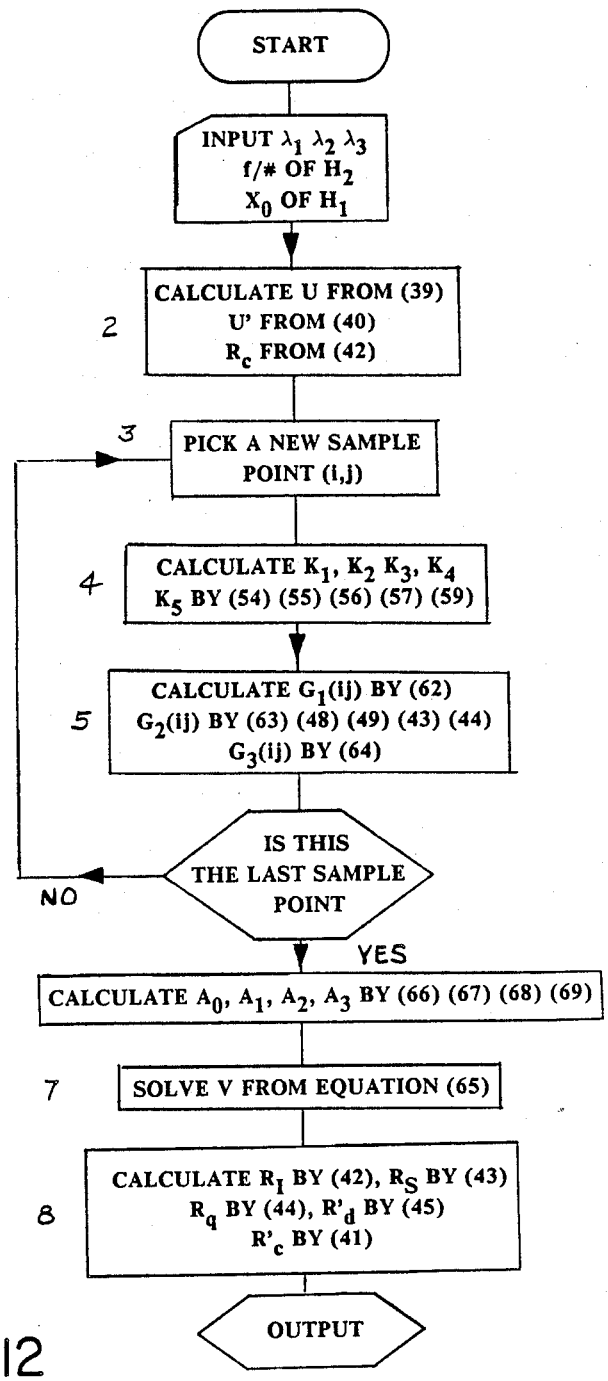
FIG. 12 is a flow chart of a computer program used in hologram analysis.

The flow chart of the computer program used to iteratively determine the optimum recording geometry is shown in FIG. 12. In step one, the input parameters $\lambda_1, \lambda_2, \lambda_3$; f/# of H2 and the half aperture $x_o$ of H1 is entered. In step two, the pertinent parameters U, U' and $R_c$ are calculated. In steps three to five, the coefficient $G_1$, $G_2$, $G_3$ are calculated for each sample point $(x_i, y_j)$ on H2 and stored in the arrays $G_1(i,j)$, $G_2(i,j)$, $G_3(i,j)$. In step 6, coefficients $A_1$, $A_2$, $A_3$ are calculate from the completed arrays $G_1$, $G_2$, $G_3$. The scale factor V is subsequently obtained by solving the roots of the polynomial in equation (65) in step 7. The final recording configuration is determined in step 8.

The dependence of the optimum v on f/#=$z'_i/(2x'_o)$ for a HOE objective designed to be used at 830 nm with the half-aperture $x'_o$=2.5 mm is given in FIG. 10. The curves are obtained theoretically for two different values of the intermediate wavelength, while all other values of the recording constant remain the same value. We note that of the optimum v are quite different in these two cases for a given f/#. Since the value of v determines the dimension of the optical arrangement for the recording of H1. Therefore, a proper selection of v may greatly facilitate the experimental setup in the fabrication of the corrector plate. In FIG. 9, results of the rms phase error of three different approaches are compared. Curve #1 represents the dependence of the rms phase error on the f/# for HOE made in ZTOA configuration with wavelength of 633 nm, designed to be used at 830 nm. We note that when the f/# of the HOE is lower than 2.0, the merit function exceeds a quarter or wavelength, thus the image degradation is now quite noticeable. We expect the higher order aberration is now more important hence ZTOA recording configuration is no longer useful. An improved technique that uses a computer program to search for the best configuration that minimizes the phase error is given in curve #2. Here, the recording wavelength is again set at 633 nm. We note that the quarter wave phase error cut off point on curve #2 is extended to f/1.5, a significant improvment over the ZTOA configuration. The computer plot phase error terrain over the HOE surface generated using this technique is given in FIG. 7.

Figure 8:
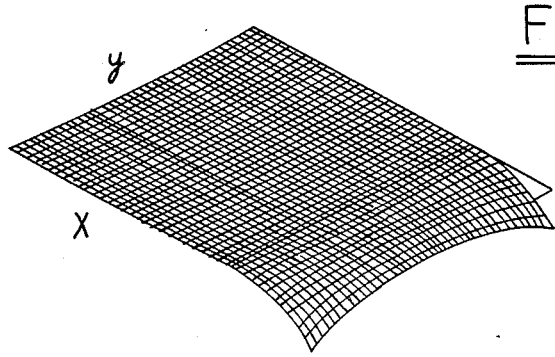

Curve #3 of FIG. 9 shows rms phase error dependence of f/190 for the HOE fabricated with the double wavelength shift scheme. We have considered $\lambda_1$=514 nm, $\lambda_2$=633 nm and $\lambda_3$=830 nm. The corrector recording optical arrangements are determined by the optimum v values as suggested by curve #1 in FIG. 10. We observe that the phase error is greatly reduced compared with that of the other approaches. Even at f/1, the rms phase error equals 0.17$\lambda_3$, the HOE can still be accepted as the diffraction limited. The computer plot of the phase error terrain is given in FIG. 8. Notice that the terrain is practically flat except near the far corners from the axis where that phase error cancellation is not 100%.

Figure 13:
FIG. 13 is an Airy disk pattern generated using the present method.
Figure 16:
FIG. 16 is an Airy disk pattern generated using a prior art technique.

As an experimental verification, we have fabricated a HOE objective with a f/# of 1.50 and an aperture of 10 mm. The system parameters for the recording were: $\lambda_1$=488 nm, the Argon blue; $\lambda_2$=514 nm, the Argon green; $\lambda_3$=633 nm, the He-Ne red; $R'_i$=15 nm, respectively. Our rms phase error for the optimal v value of 0.243 is 0.12 radius, an equivalent of 0.02 wavelengths of the He-Ne red. In FIG. 13, the point spread function of the reconstructed point source of the HOE is given. The reconstruction point is nearly diffraction limited with the dimension of the central peak smaller than 1.7 micrometers. The ratio of the peak intensity to that of the first diffraction ring was 15 to 1, as measured by a fiber probe eyepiece. In FIG. 16, the point spread function of the image of the corrector plate H1 is given. It was readout at the intermediate wavelength 514 nm. It is important to point out that the final HOE H2 was fabricated with one of its interfering beams emulated by this highly aberrated point source.

Figure 14:
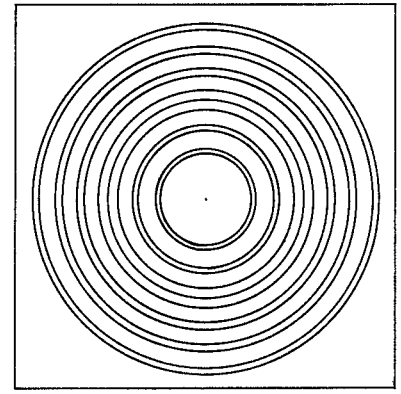
FIGS. 14-15 are diagrams of a theoretically perfect Airy disk pattern.
Figure 15:
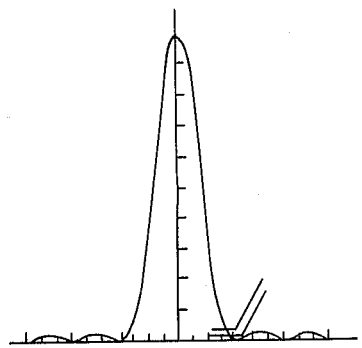
Figure 17:
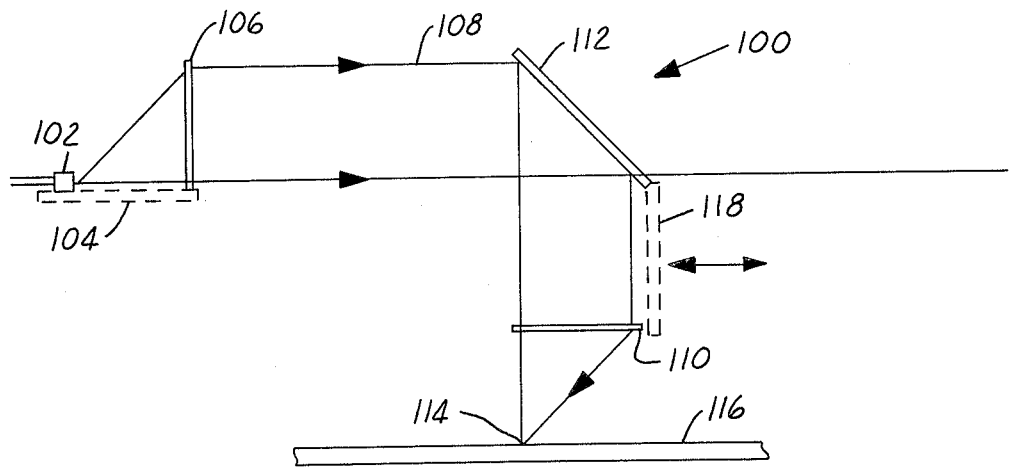
FIGS. 17-18 is an optical system employing a pair of HOEs.

The point spread function of the image shown in FIG. 13 is of very high quality, and which could only be appreciated by a comparison of that point spread diagram to a theoretically perfect ariy disk as shown in FIGS. 14 and 15, and an image created not using the double wavelength shift technique found in FIG. 16. The image of the spot created of the present invention is much more well defined and represents a dramatic improvement over low f/# HOEs recorded using the prior art techniques. The magnitude of the improvement is clearly demonstrated by the two images of FIGS. 13 and 16, however, the improvement is probably best shown in the phase error vs. f/# plot of FIG. 9. The HOE is constructed using the ZTOA method shown in curve #1, and the parameters are optimized to minimize phase error. There is a significant improvement as demonstrated by plot #2, however, when the double wavelength shift technique is employed theoretical minimum root means square phase error drops dramatically as shown by curve C. High quality HOEs constructed utilizing the present method are quite useful for creating a number of optical devices. In FIG. 17, an optical system 100 is shown which is specifically designed to illuminate a point on an optical disk. A laser diode 102 is provided affixed to a base 104. HOE 106 is affixed to base 104 adjacent the laser diode to form a collimated light beam 108 from the light emitted thereby. Collimated beam 108 is directed to HOE 110 by mirror 112 to image beam 108 to a point 114 on optical disk 116. Mirror 112 and HOE 110 are held in proper alignment relative to one another by frame 118 which forms an imaging system 120 which can be translated laterally in the direction of the arrow parallel to collimated beam emitted by HOE 106 to position point 114 at the desired radial location on optical disk 116. The mass of the imaging system 120 can be maintained significantly lower than a comparable refractive optical element device, and thereby enabling much higher indexing speeds to be achieved. This is a very important consideration when designing an optical disk reader and computer applications were data access speed is important.

Figure 18:
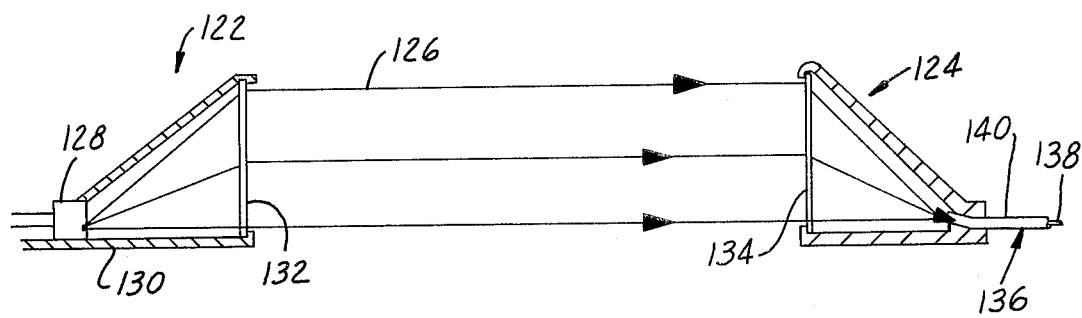

In FIG. 18, an optical system is shown which combines a collimated laser light source 122 with an imaging optical element 124 designed to focus collimated beam 126 to a point. A laser source 122 is formed of a laser diode 128, preferably a diode emitting light in the near IR range, and having a f/# between 1.0 and 2.0.

The laser diode is retained in a housing 130 which supports HOE 132 in proper spaced apart alignment with the laser diode, so as to form a collimated beam 126 from the light emitted by laser diode 128. HOE 132 has a f/# which substantially corresponds to that of the laser diode to form a small, light, compact laser light source.

It should be noted that the orientation of the HOE 132 relative to laser diode 128 is consistent with the orientation of HOE H2, imaging point I, and the reconstruction beam, generally consistent with the HOE recording scheme, as depicted in FIGS. 3 and 4.

The imaging optical element 124, shown in FIG. 18, employs a HOE 134 which images collimated beam 126 to a small point entering the end of optical fiber 136. Optical fiber 136 is comprised of a thin fiber core 138 surrounded by cladding 140 by constructing HOE 134. In accordance with the present invention, the HOE f/# may be substantially equivalent to the f/# of the fiber end. While matching the f/#'s may not be critical when optical element 124 is used for an imaging, as depicted in FIG. 18, when it is used as a culminating lense, such as when optical fiber 136 acts as a point source of light, the f/# of the HOE should be at least as small as that of the fiber end to utilize the maximum amount of light emitted by the fiber. Optical element 124 is provided with a housing 142 which precisely positions the end of optical fiber 136 with HOE 134. The core diameter of optical fiber 136 may be extremely small, i.e., less than two microns, due to the high quality of the spot imaged by HOE 134.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention.

I claim:

1. A method of making a HOE comprising the following steps:
   recording a holographic corrector plate using light of a wave length $\lambda_1$; and
   recording a HOE in light of a wave length $\lambda_2$ using an object and a reference source, with holographic corrector plate in the path of one of said sources, wherein wave lengths $\lambda_1$ and $\lambda_2$ and the recording geometry are selected relative to wave length $\lambda_3$ in which the HOE is to be used, to minimize aberration.

2. The invention of claim 1 wherein $\lambda_1$ is less than $\lambda_2$ which is less than $\lambda_3$.

3. The invention of claim 2 wherein $\lambda_3/\lambda_2$ is substantially equal to $\lambda_2/\lambda_1$.

4. The invention of claim 1 wherein said holographic corrector plate is recorded using a pair of point sources located on a recording axis oriented normal to the holographic corrector plate.

5. The invention of claim 4 wherein the holographic corrector plate is oriented in the reference source path to reconstruct an image point.

6. The invention of claim 1 further comprising the steps of:
   providing a mathematical model of the phase error over the entire HOE surface; and
   iteratively varying the relative orientations of the light sources, the holographic corrector plate, and the HOE to determine a recording geometry which will minimize the root means square value of the phase error over the HOE surface.

7. The invention of claim 6 wherein the holographic corrector plate is recording using 2 point sources having a wave length $\lambda_1$ within the visible range.

8. The invention of claim 1 wherein the holographic corrector plate is recording using 2 point sources having a wave length $\lambda_1$ within the visible range.

9. The invention of claim 8 wherein HOE is recorded using an object point source and a reconstructed image point source having a wave length $\lambda_2$ located between $\lambda_1 \times$ and $\lambda_3$ is in the near IR range.

10. A HOE recorded in accordance with claim 1.

11. A method of making a HOE comprising the following steps:
    recording a holographic corrector plate using an object source and a reference point source providing coherent light at a wave length $\lambda$HD 1; and
    recording a HOE in coherent light having a wave length of $\lambda_2$, using an object source and a reconstruction image point which is generated by passing collimated light through the holographic corrector plate, wherein $\lambda_1$ and $\lambda_2$ and the recording geometry are selected relative to the wave length $\lambda_3$ in which the HOE is to be used to minimize aberration.

12. The invention of claim 11 wherein $\lambda_3$ is in the near IR range and $\lambda_1$ and $\lambda_2$ are in the visible range to allow the HOE and the holographic corrector plate to be recorded at a wave length having high film recording sensitivity.

13. The invention of claim 12 further comprising the steps of:
    providing a mathematical model of the phase error over the entire HOE surface; and
    iteratively varying the relative orientations of the light sources, the holographic corrector plate, and the HOE to determine a recording geometry which will minimize the root means square value of the phase error over the HOE surface.

14. The invention of claim 13 wherein the holographic corrector pate is recording using 2 point sources having a wave length $\lambda_1$.

15. A HOE recorded in accordance with claim 11.

16. A method for making a HOE for use in infrared light comprising the following steps:
    recording a holographic corrector plate using a coherent object and reference light source having a wave length $\lambda_1$ in the visible range; and recording a HOE in coherent light having a wave length $\lambda_2$ using an object source and a reconstruction image point which is generated by passing light through the holographic collector plate, wherein $\lambda_2$ is within the visible range and greater than $\lambda_1$, said wave lengths $\lambda_1$ and $\lambda_2$ and the recording geometry are selected relative to the infrared wave length $\lambda_3$ in which the HOE is to be used to minimize aberration resulting from the difference in the wave lengths which the HOE is used and the HOE is recorded.

17. The invention of claim 16 further comprising the steps of:
 providing a mathematical model of the phase error over the entire HOE surface; and
 iteratively varying the relative orientations of the light sources, the holographic corrector plate, and the HOE to determine a recording geometry which will minimize the root means square value of the phase error over the HOE surface.

18. A HOE recorded in accordance with claim 16.

19. The method of forming a HOE for use in the near infrared light region to image a collimated beam to a point, said method comprising the following steps:
 selecting two wave lengths $\lambda_1$ and $\lambda_2$ in the visible light range where $\lambda_2$ divided by $\lambda_1$ is substantially equal to $\lambda_3$ divided by $\lambda_2$, where $\lambda_3$ is the near infrared wave length at which the HOE is to be used;
 selecting a recording geometry for constructing a holographic collector plate at $\lambda_1$, for constructing the HOE at $\lambda_2$, and for using the HOE at $\lambda_3$ so that when the HOE is in use the aberration resulting from phase error due to the shift between the wave length of recording and use is minimized;
 recording a holographic corrector plate using a coherent first object point and first reference point light source lying on a recording axis oriented normal to the holographic corrector plate film;
 recording a HOE using a coherent second object point and second reference point light source lying the recording axis which is normal to the HOE film, wherein said second reference point is reconstructed by passing a collimated light through the holographic corrector plate.

20. The invention of claim 19 further comprising the steps of:
 providing a mathematical model of the phase error over the entire HOE surface; and
 iteratively varying the relative orientations of the light sources, the holographic corrector plate, and the HOE to determine a recording geometry which will minimize the root means square value of the phase error over the HOE surface.

21. The invention of claim 20 wherein the iteratively varying step further comprises varying the angle $\theta$ at which light approaches the HOE during use.

22. The invention of claim 20 wherein said mathematical model utilizes a ray tracing technique which recognizes that the reconstructed 2nd reference point is aberrated and a ray extending between the holographic corrector plate and the HOE does not necessarily pass exactly through the 2nd reference point.

23. A HOE recorded in accordance with claim 19.

24. A HOE comprising:
 a sheet of transparent film onto which an interference pattern is recorded at a wave length $\lambda_2$ using an object and a reference coherent light source, and a holographic corrector plate in the light path of one of said sources, where said holographic corrector plate which was recorded at a wave length $\lambda_1$, and where the HOE is to be used at a wave length $\lambda_3$, and $\lambda_3$ is greater than $\lambda_2$ which is greater than $\lambda_1$ with $\lambda_1$ and $\lambda_2$ selected relative to $\lambda_3$ to minimize the aberration due to phse error caused by the difference between the wave lengths the HOE is recorded and used.

25. A HOE for use as an objective or culminating lens, comprising:
 a transparent sheet of film having recorded thereon an interference pattern generated by a coherent object and reference light source having a wave length $\lambda_2$, where said reference source is reconstructed by passing a collimated light through a holographic corrector plate which was recorded using two point light sources at a wave length $\lambda_1$, where wave length $\lambda_1$ and $\lambda_2$ are in the visible range and selected relative to the infrared wave length $\lambda_3$ in which the HOE is to be used to minimize aberration caused by the difference in wave lengths between $\lambda_2$ and $\lambda_3$.

26. The invention of claim 25 wherein said HOE is diffraction limited and has a f# less than 1.5.

27. The invention of claim 26 wherein the HOE is capable of focusing light to a point having a spot less than 2 micrometers.

28. A collimated laser light source comprising:
 a housing;
 means for providing a point laser source affixed to the housing and having a wave length in near infrared ranged and a f# less than 2.0; and
 a HOE having a f# substantially corresponding to that of the light source oriented relative thereto to form a collimated light beam, said HOE formed of a transparent sheet of film having recorded thereon an interference pattern generated by a coherent object and reference light source having a wave length $\lambda_2$, where said reference source is reconstructed by passing a collimated light through a holographic corrector plate which was recorded using two point light sources at a wave length $\lambda_1$, where wave length $\lambda_1$ and $\lambda_2$ are in the visible range and selected relative to the infrared wave length $\lambda_3$ in which the HOE is to be used to minimize aberration caused by the difference in wave lengths between $\lambda_2$ and $\lambda_3$.

29. The invention of claim 28 wherein said means for providing a laser source further comprises an end of a fiber optic strand.

30. A near infrared laser light source comprising:
 a housing;
 a laser diode emitting light in the near infrared range from a point having a f# between 0.75 and 2.0 affixed to the housing; and
 a HOE having a f# substantially corresponding to that of the laser diode, said HOE affixed to the housing and oriented in the path of the light emitted from the laser diode to form a collimated light beam, said HOE formed of a transparent sheet of film having recorded thereon an interference pattern generated by a coherent object and reference light source having a wave length $\lambda_2$, where said reference source is reconstructed by passing a collimated light through a holographic corrector plate which was recorded using two point light sources at a wave length $\lambda_1$, where wave length $\lambda_1$ and $\lambda_2$ are in the visible range and selected relative to the infrared wave length $\lambda_3$ in which the HOE is to be used to minimize aberration caused by the difference in wave lengths between $\lambda_2$ and $\lambda_3$.

31. The invention of claim 30 further comprising a second HOE oriented in said collimated light beam to focus said beam to a diffraction limited image point.

32. The invention of claim 31 wherein said image point has a spot size less than 2 micrometers.

* * * * *

UNITED STATES PATENT AND TRADEMARK OFFICE
CERTIFICATE OF CORRECTION

PATENT NO.  : 4,850,662

DATED       : July 25, 1989

INVENTOR(S) : Hsuan S. Chen

It is certified that error appears in the above-identified patent and that said Letters Patent is hereby corrected as shown below:

Column 1, Line 14,
"convention" should be --conventional--.

Column 1, Line 52, before
"recording" insert --of--.

Column 2, Line 53,
"prospective" should be --perspective--.

Column 2, Line 56, "means"
should be --mean--.

Column 3, Line 7, before
"HOE" insert --the--.

Column 3, Line 13, "is"
should be --are--.

Column 6, Line 18, before
"the angle" insert --is--.

Column 6, Line 48, after "$\Delta y$" delete --.--.

Column 6, Line 50, before "$\Delta x \Delta y$" insert --and--.

Column 6, Line 55, "f-1.3"
should be --f/1.3--.

Column 6, Line 64, "SHAFT"
should be --SHIFT--.

UNITED STATES PATENT AND TRADEMARK OFFICE
CERTIFICATE OF CORRECTION

PATENT NO. : 4,850,662
DATED : July 25, 1989
INVENTOR(S) : Hsuan S. Chen

It is certified that error appears in the above-identified patent and that said Letters Patent is hereby corrected as shown below:

Column 7, Line 55, after "theory" insert --is:--.

Column 8, Line 22, "SHAFT" should be --SHIFT--.

Column 8, Line 66, "give" should be --given--.

Column 10, Line 20, "Where should be --where--.

Column 13, Line 59, "or wavelength" should be --of the wavelength--.

Column 14, Line 5, "f/19o" should be --f/1.9--.

Column 15, Line 39, "culminating" should be --collimating--.

Column 16, Line 22, Claim 7, "recording" should be --recorded--.

Column 16, Line 26, Claim 8, "recording" should be --recorded--.

Column 16, Line 61, Claim 14, "recording" should be --recorded--.

Column 17, Line 4, Claim 16, "collector" should be --corrector--.

UNITED STATES PATENT AND TRADEMARK OFFICE
CERTIFICATE OF CORRECTION

PATENT NO. : 4,850,662

DATED : July 25, 1989

INVENTOR(S) : Hsuan S. Chen

It is certified that error appears in the above-identified patent and that said Letters Patent is hereby corrected as shown below:

Column 17, Line 31, Claim 19,
"collector" should be --corrector--.

Column 18, Line 10, Claim 15,
"culminating" should be --collimating--.

Signed and Sealed this

Third Day of March, 1992

Attest:

HARRY F. MANBECK, JR.

*Attesting Officer*          *Commissioner of Patents and Trademarks*